(12) United States Patent
Warth et al.

(10) Patent No.: US 10,598,259 B2
(45) Date of Patent: Mar. 24, 2020

(54) TRANSMISSION FOR A MOTOR VEHICLE

(71) Applicant: ZF Friedrichshafen AG, Friedrichshafen (DE)

(72) Inventors: Viktor Warth, Friedrichshafen (DE); Uwe Griesmeier, Markdorf (DE); Martin Brehmer, Tettnang (DE); Peter Ziemer, Tettnang (DE); Johannes Kaltenbach, Friedrichshafen (DE); Stefan Beck, Eriskirch (DE); Raffael Kuberczyk, Ravensburg (DE); Michael Wechs, Weißensberg (DE); Stephan Scharr, Friedrichshafen (DE); Eckehard Münch, Bünde (DE); Bernd Knöpke, Salem (DE); Matthias Horn, Tettnang (DE); Jens Moraw, Friedrichshafen (DE); Julian King, Rankweil (AT); Juri Pawlakowitsch, Kressbronn (DE); Gerhard Niederbrucker, Friedrichshafen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 85 days.

(21) Appl. No.: 16/060,535

(22) PCT Filed: Nov. 22, 2016

(86) PCT No.: PCT/EP2016/078454
§ 371 (c)(1),
(2) Date: Jun. 8, 2018

(87) PCT Pub. No.: WO2017/108310
PCT Pub. Date: Jun. 29, 2017

(65) Prior Publication Data
US 2019/0003556 A1    Jan. 3, 2019

(30) Foreign Application Priority Data

Dec. 23, 2015 (DE) .................. 10 2015 226 688

(51) Int. Cl.
| | |
|---|---|
| *F16H 3/66* | (2006.01) |
| *F16H 3/72* | (2006.01) |
| *B60K 6/365* | (2007.10) |

(52) U.S. Cl.
CPC .......... *F16H 3/66* (2013.01); *B60K 6/365* (2013.01); *F16H 3/725* (2013.01);
(Continued)

(58) Field of Classification Search
CPC ...... F16H 3/66; F16H 3/725; F16H 2200/201; F16H 2200/2046; F16H 2200/2097; B60K 6/365
(Continued)

(56) References Cited

U.S. PATENT DOCUMENTS 7,014,590 B2    3/2006  Stevenson
10,315,503 B2 *  6/2019  Beck ............... B60K 6/365
(Continued)

FOREIGN PATENT DOCUMENTS

DE         10162889 A1    7/2003
DE       102004030115 A1  1/2005
(Continued)

OTHER PUBLICATIONS

German Search Report DE102015226688.5 dated Dec. 14, 2016, (10 pages).
(Continued)

*Primary Examiner* — Leslie A Nicholson, III
(74) *Attorney, Agent, or Firm* — Dority & Manning, P.A.

(57) ABSTRACT

The invention relates to a transmission (G) for a motor vehicle, wherein the transmission (G) comprises an input
(Continued)

shaft (GW1), an output shaft (GW2), three planetary gear sets (P1, P2, P3), as well as at least five shift elements (B1, K1, K2, K3, K4), wherein, by means of selective engagement of the at least five shift elements (B1, K1, K2, K3, K4), seven forward gears (1 to 7) can be selected between the input shaft (GW1) and the output shaft (GW2), and a drive train for a motor vehicle comprising such a transmission (G).

15 Claims, 10 Drawing Sheets

(52) U.S. Cl.
CPC .................. *F16H 2200/201* (2013.01); *F16H 2200/2043* (2013.01); *F16H 2200/2097* (2013.01)

(58) Field of Classification Search
USPC .......................................................... 475/275
See application file for complete search history.

(56) References Cited

U.S. PATENT DOCUMENTS

| | | | |
|---|---|---|---|
| 2003/0083174 A1 | 5/2003 | Tabata et al. | |
| 2003/0203787 A1* | 10/2003 | Usoro | F16H 3/66 475/279 |
| 2004/0106490 A1* | 6/2004 | Park | F16H 3/666 475/275 |
| 2007/0197335 A1* | 8/2007 | Raghavan | B60K 6/365 475/5 |
| 2007/0275807 A1* | 11/2007 | Bucknor | B60W 10/08 475/5 |
| 2008/0015073 A1 | 1/2008 | Raghavan et al. | |
| 2011/0245017 A1* | 10/2011 | Kim | F16H 3/666 475/275 |
| 2013/0012351 A1* | 1/2013 | Jang | F16H 3/666 475/275 |
| 2017/0108086 A1* | 4/2017 | Kwon | F16H 3/66 |
| 2018/0134141 A1 | 5/2018 | Beck et al. | |
| 2018/0328466 A1* | 11/2018 | Warth | B60K 6/48 |

FOREIGN PATENT DOCUMENTS

| | | |
|---|---|---|
| DE | 102006001763 A1 | 8/2007 |
| DE | 102015209141 A1 | 11/2016 |

OTHER PUBLICATIONS

International Search Report (English Translation) PCT/EP2016/078454, dated Feb. 17, 2017. (2 pages).

\* cited by examiner

| Gear | B1 | K1 | K2 | K3 | K4 |
|------|----|----|----|----|----|
| 1    | x  |    |    |    | x  |
| 2    | x  |    | x  |    |    |
| 3    | x  | x  |    |    |    |
| 4.1  |    | x  | x  |    |    |
| 4.2  |    | x  |    |    | x  |
| 4.3  |    |    | x  |    | x  |
| 5    |    | x  |    | x  |    |
| 6    |    |    | x  | x  |    |
| 7    |    |    |    | x  | x  |

Fig. 8

| Gear | B1 | B2 | K1 | K2 | K3 | K4 | K5 |
|---|---|---|---|---|---|---|---|
| 1 | x | | | | | x | x |
| 2 | x | | | x | | | x |
| 3 | x | | x | | | | x |
| 4.1 | | | x | x | | | x |
| 4.2 | | | x | | | x | x |
| 4.3 | | | | | x | x | x |
| 5 | | | x | | x | | x |
| 6 | | | | x | x | | x |
| 7 | | | | | x | x | x |
| R1 | | x | | x | x | | |

Fig. 10

TRANSMISSION FOR A MOTOR VEHICLE

FIELD OF THE INVENTION

The invention relates generally to a transmission for a motor vehicle, and to a motor vehicle drive train including such a transmission.

BACKGROUND

DE 10 2004 030 115 A1 describes a transmission for a motor vehicle, in which multiple planetary gear sets are provided between an input shaft and an output shaft, each of which is composed of one sun gear, one ring gear, and one planet spider. Furthermore, multiple shift elements are provided, via the selective actuation of which the planetary gear sets can be coupled to each other in order to define different gears between the input shaft and the output shaft. In all, seven forward gears can be selected between the input shaft and the output shaft in this case.

SUMMARY OF THE INVENTION

In the present case, a transmission refers to a multi-stage transmission, i.e., multiple different transmission ratios can be selected, as gears, between an input end and an output end of the transmission by actuating appropriate shift elements, wherein this is preferably automatically carried out. Depending on the arrangement of the shift elements, the shift elements are either clutches or brakes. These types of transmissions are utilized preponderantly in motor vehicles in order to implement a suitable operating range of the particular motor vehicle.

Example aspects of the present invention provide an alternative embodiment of the transmission known in the prior art, including at least seven forward gears between an input shaft and an output shaft.

According to the invention, a transmission includes an input shaft and an output shaft, as well as a first, a second, and a third planetary gear set. The planetary gear sets each include multiple elements in the form of a sun gear, a ring gear, and a planet spider in each case, wherein the planetary gear sets are utilized for guiding a power flow from the input shaft to the output shaft. For this purpose, a first, a second, a third, a fourth, and a fifth shift element are provided, via the selective actuation of which the planetary gear sets can be coupled to each other while selecting different forward gears between the input shaft and the output shaft.

In this case, the first element of the first planetary gear set is permanently rotationally fixed and, therefore, is permanently prevented from rotating or making a turning motion, while the second element of the first planetary gear set is connected in a rotationally fixed manner to the input shaft. By engaging the fourth shift element, the third element of the first planetary gear set can be coupled in a rotationally fixed manner to the first element of the second planetary gear set, which can also be fixed in a rotationally fixed manner to a housing of the transmission by the first shift element. Furthermore, the third element of the second planetary gear set can be connected in a rotationally fixed manner, on the one hand, to the input shaft via the second shift element and, on the other hand, to the second element of the third planetary gear set by the third shift element, which second element is coupled in a rotationally fixed manner to the output shaft. Finally, the first element of the third planetary gear set is connected in a rotationally fixed manner to the input shaft and the second planetary gear set can be interlocked via the fifth shift element.

In other words, therefore, in the case of planetary gear sets, the first element of the first planetary gear set is fixed to a housing and, therefore, is permanently prevented from making a turning motion, while the second element of the first planetary gear set and the first element of the third planetary gear set are permanently coupled in a rotationally fixed manner to the input shaft. Furthermore, the second element of the third planetary gear set is connected in a rotationally fixed manner to the output shaft.

By engaging the fourth shift element, the third element of the first planetary gear set is coupled in a rotationally fixed manner to the first element of the second planetary gear set, while an actuation of the first shift element results in a fixing of the first element of the second planetary gear set to the housing. An engagement of the fifth shift element results in an interlock of the second planetary gear set, while the second shift element, upon actuation, couples the third element of the second planetary gear set to the input shaft in a rotationally fixed manner. The third element of the second planetary gear set can also be connected in a rotationally fixed manner via the third shift element, upon the actuation thereof, to the second element of the third planetary gear set and, therefore, to the output shaft.

Consequently, the second, the third, the fourth, and the fifth shift elements are each designed as clutches which, upon actuation, equalize rotatable components of the transmission to each other in terms of their turning motions, while the first shift element is present as a brake which, upon actuation, decelerates the respective rotatable component of the transmission to a standstill and fixes it to the housing.

A transmission designed according to the invention is distinguished by a compact design, low component loads, and good gearing efficiency.

According to one embodiment of the invention, the second element of the second planetary gear set is permanently connected in a rotationally fixed manner to the third element of the third planetary gear set. In one refinement of this embodiment, seven forward gears can be implemented between the input shaft and the output shaft by selectively engaging two of the five shift elements in each case.

In this case, a first forward gear is selected by actuating the first and the fifth shift elements, while a second forward gear is formed by engaging the first and the third shift elements. Moreover, a third forward gear is obtained by actuating the first and the second shift elements, while a fourth forward gear can be selected by actuating the second and the third shift elements. Alternatively thereto, the fourth forward gear can also be implemented by engaging the second and the fifth shift elements or by actuating the third and the fifth shift elements. In addition, a fifth forward gear is formed by actuating the second and the fourth shift elements. Finally, a sixth forward gear is selected by engaging the third and the fourth shift elements and a seventh forward gear is selected by actuating the fourth and the fifth shift elements.

By a suitable selection of stationary transmission ratios of the planetary gear sets, a transmission ratio range which is suitable for the application in the case of a motor vehicle is therefore implemented. Except for the third variant for the fourth forward gear, the condition of two shift elements in each case is always to be varied in order to successively select the forward gears in sequence, by disengaging one of the shift elements contributing to the preceding forward gear and engaging another shift element in order to implement the subsequent forward gear. As a further consequence thereof, a shift between the gears can take place very rapidly.

Alternatively to the aforementioned embodiment, a sixth shift element and a seventh shift element are also provided, wherein the second element of the second planetary gear set can be connected in a rotationally fixed manner, on the one hand, to the third element of the third planetary gear set via the sixth shift element and, on the other hand, can be fixed to the housing by the seventh shift element. In this case, therefore, the second element of the second planetary gear set is not permanently connected to the third element of the third planetary gear set, but rather can be coupled in a rotationally fixed manner thereto via the sixth shift element or can be fixed to the housing by the seventh shift element. The sixth and the seventh shift elements can be combined in this case to form a double shift element, since said shift elements are not to be actuated at the same time. As a result, a compact design can be achieved in this area.

As yet another refinement of the aforementioned alternative embodiment, seven forward gears can be implemented between the input shaft and the output shaft by selectively engaging, in each case, three of the seven shift elements in all in this case.

In this case, a first forward gear is selected by actuating the first, the fifth, and the sixth shift elements, while a second forward gear is formed by engaging the first, the third, and the sixth shift elements. Moreover, a third forward gear is obtained by actuating the first, the second, and the sixth shift elements, while a fourth forward gear can be selected by actuating the second, the third, and the sixth shift elements. Alternatively thereto, the fourth forward gear can also be implemented by engaging the second, the fifth, and the sixth shift elements or by actuating the third, the fifth, and the sixth shift elements. In addition, a fifth forward gear is formed by actuating the second, the fourth, and the sixth shift elements. Finally, a sixth forward gear is selected by engaging the third, the fourth, and the sixth shift elements and a seventh forward gear is selected by actuating the fourth, the fifth, and the sixth shift elements. In addition, one reverse gear can be implemented by actuating the third, the fourth, and the seventh shift elements.

Advantageously, in the aforementioned embodiment, one reverse gear for a power train can be implemented via the drive machine connected upstream from the transmission. This reverse gear can be implemented, in this case, as an alternative or in addition to an arrangement of an electric machine or motor, in order to still be capable of enabling the motor vehicle to travel in reverse in the case of a failure of the electric machine.

According to the invention, an interlock of the second planetary gear set is implemented via the fifth shift element, in that, upon actuation thereof, the fifth shift element couples, in a rotationally fixed manner, the first element and the second element of the second planetary gear set to each other or, alternatively thereto, the first element and the third element of the second planetary gear set to each other or, alternatively thereto, the second element and the third element of the second planetary gear set to each other. The required interlock of the second planetary gear set is achieved in all three cases.

In one refinement of the invention, an electric machine or motor is provided, the rotor of which is coupled in a rotationally fixed manner to one of the elements of the planetary gear sets. Preferably, a stator of the electric machine is then connected in a rotationally fixed manner to the housing of the transmission, wherein the electric machine can be operated as an electric motor and/or as a generator in this case in order to implement different functions. In particular, purely electric driving, boosting via the electric machine, deceleration and recuperation and/or synchronization in the transmission can be implemented via the electric machine in this case. Preferably, the rotor of the electric machine is coupled to the third element of the first planetary gear set in this case, wherein, as a result, purely electric travel of the motor vehicle in reverse is implemented in a suitable way. For this purpose, in particular, the first forward gear is selected in the transmission and a turning motion in the opposite direction is initiated via the electric machine, and therefore the travel of the motor vehicle in reverse takes place in the transmission ratio of the first forward gear. Consequently, the transmission ratio of the first forward gear can be utilized for forward travel as well as for travel in reverse.

Since the first element of the first planetary gear set is permanently rotationally fixed and the second element of the first planetary gear set is permanently connected to the input shaft, a fixed ratio results between the input shaft and the third element of the first planetary gear set, independently of the gear which has been selected. In this case, the rotor of the electric machine rotates, in every gear, at a higher rotational speed than the input shaft, and therefore the electric machine can be designed for higher rotational speeds and a lower torque, whereby the electric motor is to be manufactured smaller and at lower cost. In addition, the first planetary gear set contributes to the formation of the gears. Therefore, no additional planetary gear set is required for forming the pre-ratio for the electric machine. The third element of the first planetary gear set also has a rotational speed in every gear. The transmission therefore enables both power output and power uptake by the electric machine, in every gear.

According to yet another design option of the invention, which is implemented, in particular, in combination with the aforementioned arrangement of an electric machine, a separating clutch is also provided, via which the input shaft can be connected in a rotationally fixed manner to a connecting shaft. The connecting shaft is utilized within a motor vehicle drive train as the connection to the drive machine. Providing the separating clutch has the advantage, in this case, that a connection to the driving machine can be interrupted during the purely electric driving, whereby the drive machine is not entrained. The separating clutch is preferably designed, in this case, as a form-fit shift element, such as a dog clutch or a lock-synchronizer mechanism, although the separating clutch can just as well be present as a friction-locking shift element, such as a multi-disk clutch.

In general, a starting component can be connected upstream from the transmission, for example a hydrodynamic torque converter or a friction clutch. This starting component can then also be an integral part of the transmission and acts to configure a starting process, in that the starting component enables a slip speed between the internal combustion engine and the input shaft of the transmission. In this case, one of the shift elements of the transmission or the separating clutch, which may be present, can also be designed as such a starting component, in that it or they is or are present as a frictional shift element.

According to yet another embodiment of the invention, the respective planetary gear set is present as a negative or minus planetary gear set, wherein the respective first element of the respective planetary gear set is a respective sun gear, the respective second element of the respective planetary gear set is a respective planet spider, and the respective third element of the respective planetary gear set is a respective ring gear. A minus planetary gear set is composed, in a way known, in principle, to a person skilled in the art, of the elements sun gear, planet spider, and ring gear, wherein the planet spider guides at least one planetary gear, although preferably multiple planetary gears which each individually intermesh with the sun gear as well as with the surrounding ring gear. Of the first, the second, and the third planetary gear sets, one or multiple planetary gear sets are then configured as such minus planetary gear sets. It is particularly preferred when all three planetary gear sets are present as minus planetary gear sets, whereby a particularly compact design can be implemented.

Alternatively or additionally thereto, the respective planetary gear set is present as a positive or plus planetary gear set, wherein the respective first element of the respective planetary gear set is a respective sun gear, the respective second element of the respective planetary gear set is a respective ring gear, and the respective third element of the respective planetary gear set is a respective planet spider. In a plus planetary gear set as well, the elements sun gear, ring gear, and planet spider are present, wherein the latter guides at least one pair of planet gears, in which the one planet gear is meshed with the internal sun gear and one planet gear is meshed with the surrounding ring gear, and the planet gears are intermeshed with each other. In the transmission according to the invention, one or multiple planetary gear sets can also be designed as such plus planetary gear sets.

Where possible, a minus planetary gear set can be replaced by a plus planetary gear set, wherein, as compared to the design as a minus planetary gear set, the ring gear and the planet spider connection are to be interchanged, and a stationary transmission ratio is to be increased by one. As mentioned above, it is preferred, however, when all planetary gear sets are designed as minus planetary gear sets.

In one refinement of the invention, one or multiple shift elements are each implemented as friction-locking shift elements. Friction-locking shift elements have the advantage that they can also be shifted under load, and therefore a changeover between the gears can be carried out without an interruption of tractive force. It is particularly preferred, however, when the first shift element and/or, in the case of the one embodiment of the invention, the sixth and/or the seventh shift elements are each designed as a form-fit shift element, such as a dog clutch or a lock-synchronizer mechanism. This is the case because the first shift element contributes to the first three forward gears, and therefore, when the gears are shifted in succession, all that is necessary in this case is to disengage the respective shift element. In the case of the sixth and the seventh shift elements, a changeover between the two shift elements is carried out when the motor vehicle is at a standstill, and therefore a gear change operation is not to be carried out under load in this case, either. A form-fit shift element has the advantage over a friction-locking shift element that only low drag torques occur in the disengaged condition, and therefore high efficiency can be achieved.

According to yet another embodiment of the invention, mounting interfaces of the input shaft and of the output shaft are situated coaxially to each other. In this case, the mounting interfaces of the input shaft and of the output shaft can be implemented at opposite axial ends of the transmission or also at one and the same axial end. In an arrangement of the mounting interfaces on opposite axial ends, the third planetary gear set has the greatest axial distance from the outer interface of the input shaft, wherein such an arrangement is particularly suitable for the application of the transmission in a motor vehicle comprising a drive train aligned in parallel to the direction of travel of the motor vehicle. In the arrangement of the interfaces of the input shaft and the output shaft at one axial end, the third planetary gear set then preferably has the shortest axial distance to the outer interface of the input shaft, wherein the outer interface of the output shaft then preferably includes a tooth system which intermeshes with a tooth system of a shaft arranged axially parallel to the input shaft axis of the transmission. It is particularly preferred when the axle differential of a drive axle is then arranged on this shaft. This type of arrangement is then particularly suitable for the application in a motor vehicle comprising a drive train aligned transversely to the direction of travel of the motor vehicle.

The transmission according to the invention is, in particular, part of a motor vehicle drive train and is then arranged between a drive machine of the motor vehicle, which is configured, in particular, as an internal combustion engine, and further components of the drive train, which follow in the direction of power flow to driving wheels of the motor vehicle. In this case, the input shaft of the transmission is either permanently coupled to a crankshaft of the internal combustion engine in a rotationally fixed manner or can be connected thereto via an intermediate separating clutch or a starting component, wherein a torsional vibration damper can also be provided between the internal combustion engine and the transmission. On the output end, the transmission is then preferably coupled, within the motor vehicle drive train, to an axle transmission of a drive axle of the motor vehicle, wherein a connection to an interaxle differential can also be present in this case, however, via which a distribution to multiple driven axles of the motor vehicle can take place.

In the sense of the invention, the expression that two components of the transmission "are connected to each other in a rotationally fixed manner" means that these components are permanently connected, and therefore the components rotate at one and the same rotational speed. In that respect, no shift element is provided between these components, which can be elements of the planetary gear sets or also shafts or a housing of the transmission. Instead, the corresponding components are rigidly connected to each other.

However, if a shift element is provided between two components of the transmission, these components are not permanently coupled to each other in a rotationally fixed manner. Instead, a rotationally fixed coupling is first carried out via the intermediate shift element. In this case, an actuation of the shift element means, in the sense of the invention, that the respective shift element is transferred into an engaged condition and, consequently, equalizes the components to be coupled thereto in terms of their turning motions. In the case of an embodiment of the respective shift element as a form-fit shift element, the components connected to each other in a rotationally fixed manner via the shift element rotate at the same rotational speed, while, in the case of a friction-locking shift element, speed differences can exist between the components even after an actuation of said shift element. This intentional or unintentional condition is nevertheless referred to, within the scope of the invention, as a rotationally fixed connection of the respective components via the shift element.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference characters is not intended to limit the scope of protection of the claims.

BRIEF DESCRIPTION OF THE DRAWINGS

Advantageous embodiments of the invention, which are explained in the following, are represented in the drawings. In the drawings:

FIG. 8 shows an exemplary shift pattern of the transmission from FIGS. 2 to 7;

FIG. 10 shows an exemplary shift pattern of the transmission from FIG. 9.

DETAILED DESCRIPTION

Figure 1:
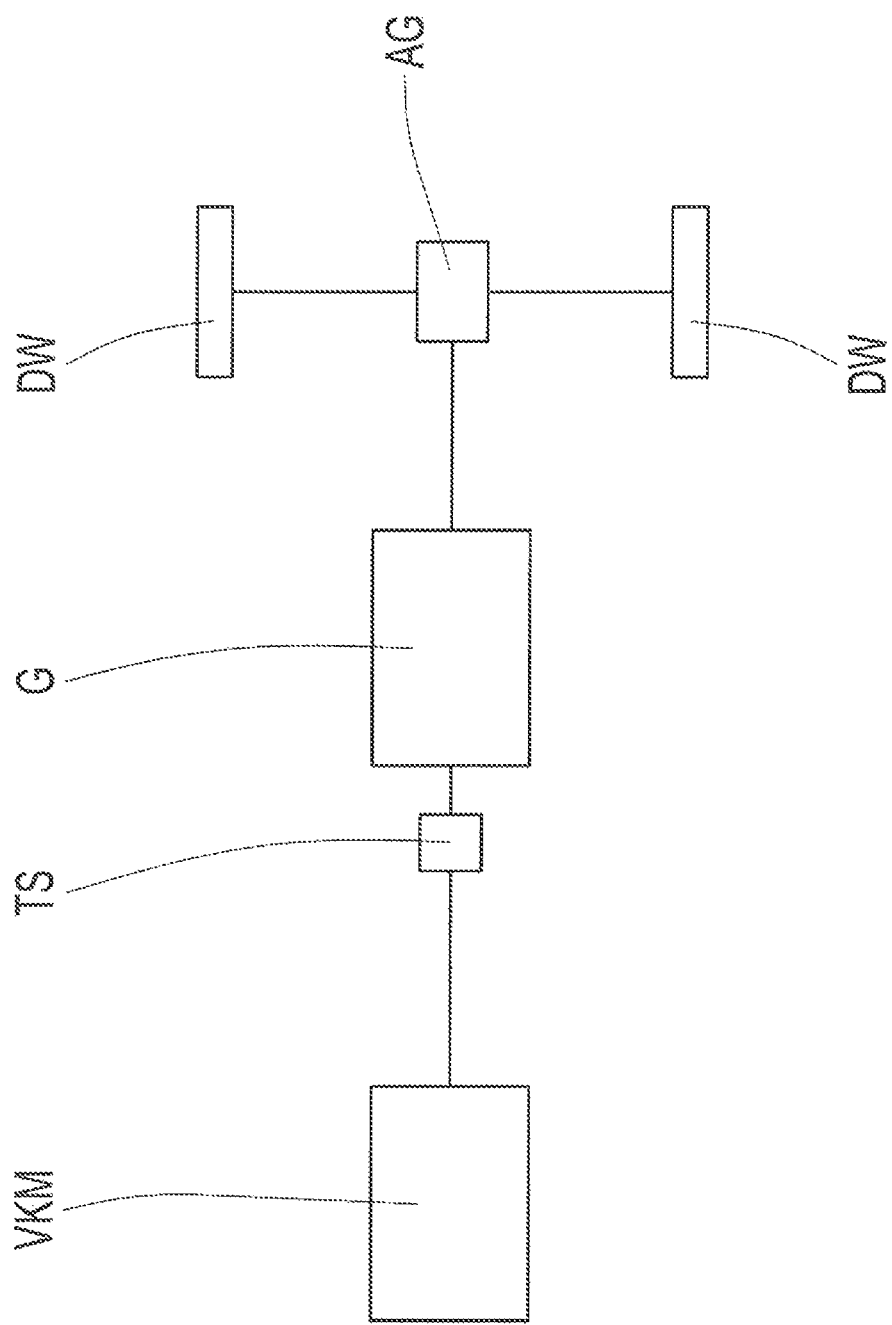
FIG. 1 shows a schematic view of a motor vehicle drive train in which a transmission according to example aspects of the invention is utilized.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a motor vehicle drive train, in which an internal combustion engine VKM is connected to a transmission G via an intermediate torsional vibration damper TS. Connected downstream from the transmission G, on the output end thereof, is an axle transmission AG, via which drive power is distributed to driving wheels DW on a drive axle of the motor vehicle.

Figure 2:
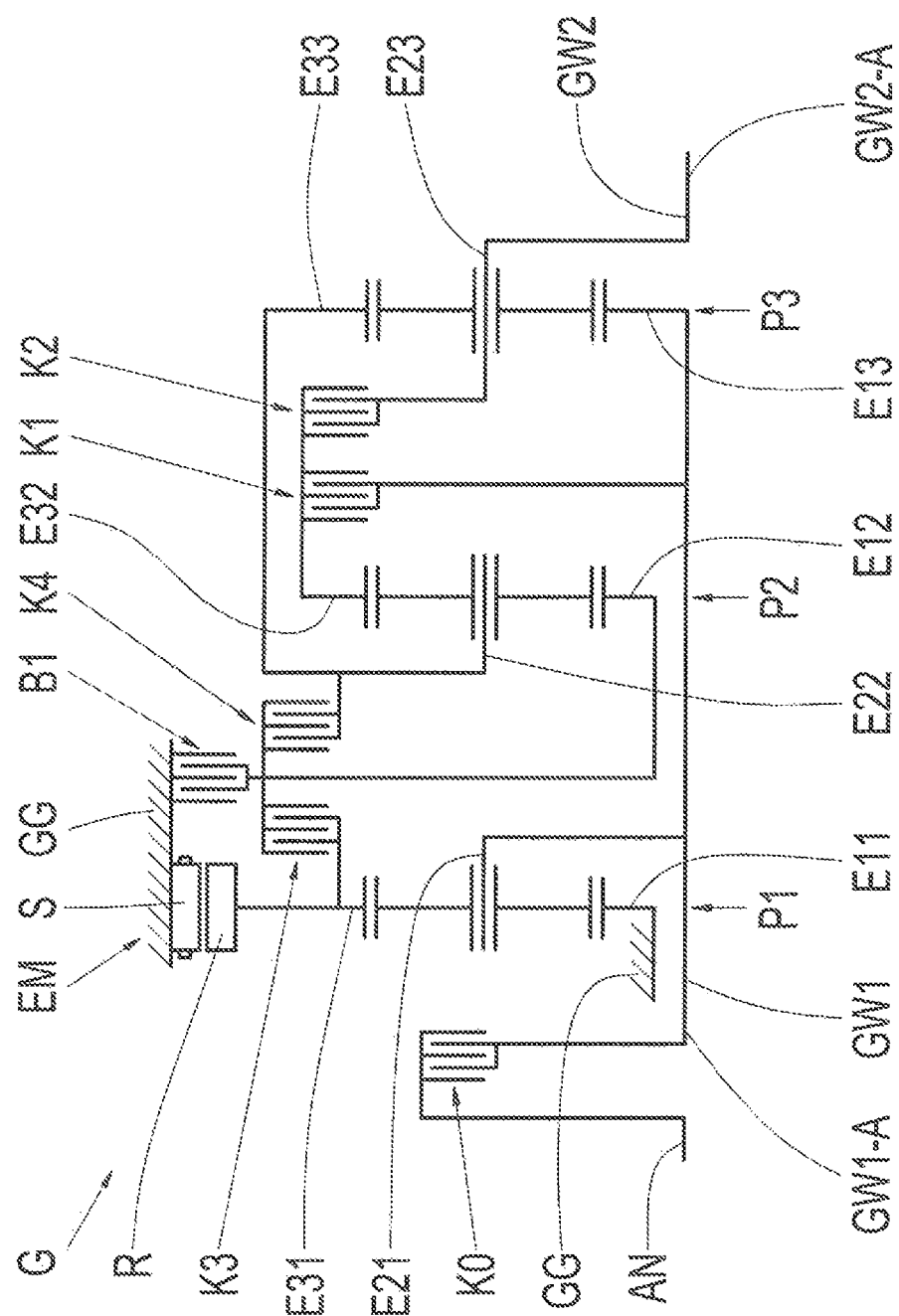
FIG. 2 shows a schematic view of a transmission according to a first embodiment of the invention.

FIG. 2 shows a schematic representation of the transmission G according to a first embodiment of the invention. As is apparent, the transmission G includes a first planetary gear set P1, a second planetary gear set P2, and a third planetary gear set P3. Each of the planetary gear sets P1, P2 and P3 includes a first element E11 or E12 or E13, respectively, a second element E21 or E22 or E23, respectively, and a third element E31 or E32 or E33, respectively. The respective first element E11 or E12 or E13 is always formed, in this case, by a sun gear of the respective planetary gear set P1 or P2 or P3, while the respective second element E21 or E22 or E23 of the respective planetary gear set P1 or P2 or P3 is present as a planet spider in each case. The respective third element E31 or E32 or E33 still remaining is then formed by a respective ring gear.

The planetary gear sets P1, P2 and P3 are therefore each configured as negative or minus planetary gear sets in this case, in which the respective planet spider guides one planetary gear, although preferably multiple planetary gears in a rotatably mounted manner, each of which individually intermeshes with the radially internal sun gear and also with the surrounding ring gear. At a point at which the connection would permit, however, individual or even all planetary gear sets P1, P2, P3 could also be designed as so-called positive or plus planetary gear sets, in which a respective planet spider supports at least one pair of planet gears, of which planet gears one planet gear is meshed with a radially internal sun gear and one planet gear is meshed with a radially surrounding ring gear, and the planet gears of the pair of gears intermesh with each other. As compared to a respective design as a minus planetary gear set, the respective second element E21 or E22 or E23 would then need to be formed by the respective ring gear and the respective third element E31 or E32 or E33 would need to be formed by the respective planet spider and, in addition, a stationary transmission ratio would need to be increased by one.

As is apparent in FIG. 2, the transmission G includes a total of five shift elements in the form of a first shift element B1, a second shift element K1, a third shift element K2, a fourth shift element K3, and a fifth shift element K4, each of which are present as friction-locking shift elements and are preferably designed as lamellar shift elements. The first shift element B1, upon actuation, fixes the first element E12 of the second planetary gear set P2 to the housing GG, wherein the first element E12 can also be connected in a rotationally fixed manner, on the one hand, to the third element E31 of the first planetary gear set P1 via the fourth shift element K3, upon the actuation thereof, and, on the other hand, to the second element E22 of the second planetary gear set P2 via actuation of the fifth shift element K4. The latter results in an interlock of the second planetary gear set P2. The second element E22 of the second planetary gear set P2 is furthermore permanently connected in a rotationally fixed manner to the third element E33 of the third planetary gear set P3.

Moreover, the first element E11 of the first planetary gear set P1 is permanently fixed to the housing GG, while the second element E21 of the first planetary gear set P1 is connected in a rotationally fixed manner to an input shaft GW1 of the transmission G. Apart from the second element E21, the input shaft GW1 is still permanently connected in a rotationally fixed manner to the first element E13 of the third planetary gear set P3 and can be coupled in a rotationally fixed manner to the third element E32 of the second planetary gear set P2 via actuation of the second shift element K1. The third element E32 of the second planetary gear set P2 can then also be connected, in a rotationally fixed manner, to the second element E23 of the third planetary gear set P3 via actuation of the third shift element K2, which second element E23 is permanently connected in a rotationally fixed manner to an output shaft GW2 of the transmission G.

The three planetary gear sets P1, P2, P3 are axially arranged in the sequence first planetary gear set P1, second planetary gear set P2, and third planetary gear set P3. The input shaft GW1 and the output shaft GW2 include mounting interfaces GW1-A and GW2-A, respectively, which, situated coaxially to each other, are provided on opposite axial ends of the transmission G. In this case, the first planetary gear set P1 is situated directly adjacent to the mounting interface GW1-A of the input shaft GW1, while the third planetary gear set P3 is situated furthest therefrom and directly adjacent to the mounting interface GW2-A of the output shaft GW2. While the output shaft GW2 is connected in a rotationally fixed manner within the motor vehicle drive train represented in FIG. 1 to an input side of the subsequent axle transmission AG at the mounting interface GW2-A, the input shaft GW1 can be connected in a rotationally fixed manner at its mounting interface GW1-A via an intermediate separating clutch K0, which is configured as a lamellar shift element in this case, to a connecting shaft AN which, in turn, is connected to a crankshaft of the internal combustion engine VKM by the intermediate torsional vibration damper TS.

The transmission G also includes an electric motor or machine EM, the stator S of which is fixed to the transmission housing GG, while a rotor R of the electric machine EM is connected in a rotationally fixed manner to the third element E31 of the first planetary gear stage P1. Purely electric driving can be implemented via the electric machine EM, wherein, in this case, the separating clutch K0 is disengaged in order to decouple the input shaft GW1 from the connecting shaft AN and to not entrain the internal combustion engine VKM.

Figure 3:
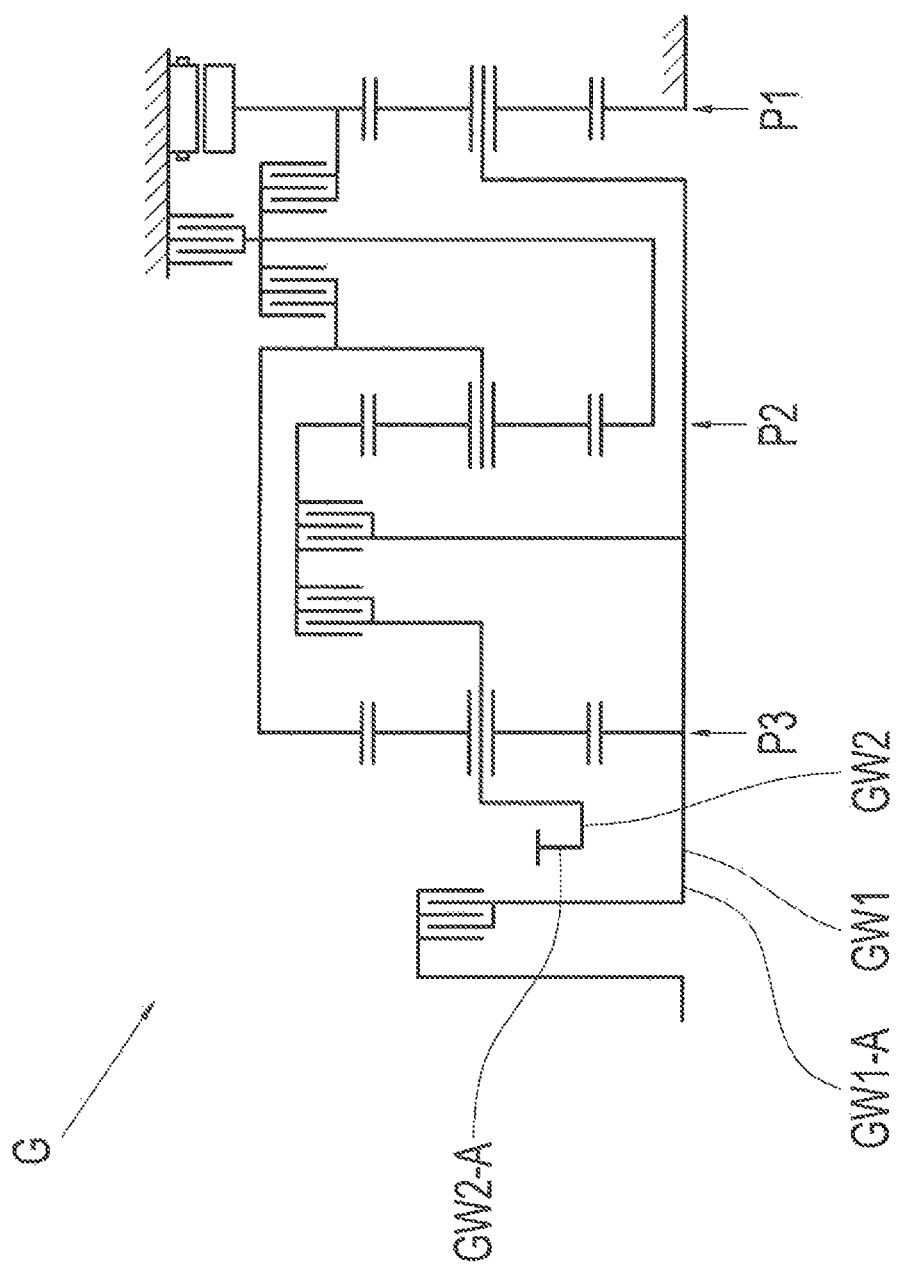
FIG. 3 shows a schematic representation of a transmission according to a second embodiment of the invention.

FIG. 3 shows a schematic view of a transmission G according to a second design option of the invention, which essentially corresponds to the variant represented in FIG. 2. In contrast to the variant according to FIG. 2, the arrangement of the three planetary gear sets P1, P2 and P3 has been changed and, in addition, the mounting interfaces GW1-A and GW2-A of the input shaft GW1 and of the output shaft GW2 are provided at one and the same end of the transmission G. In this case, the third planetary gear set P3 is provided directly adjacent to the two mounting interfaces GW1-A and GW2-A, wherein the second planetary gear set P2 and the first planetary gear set P1 follow thereon. In addition, the mounting interface GW2-A includes a tooth system which, in the installed condition of the transmission G, intermeshes with an associated tooth system of a shaft which is not represented. This shaft is then arranged axially parallel to the input shaft and the output shaft GW1 and GW2, wherein an axle transmission can then be arranged on this shaft. In that respect, the transmission G represented in FIG. 3 is suitable for the application in a motor vehicle drive train which is aligned transversely to the direction of travel of the motor vehicle. For the rest, the transmission G in FIG. 3 corresponds to the preceding variant according to FIG. 2 in terms of the connection of the individual components, and therefore reference is made to the description thereof.

Figure 4:
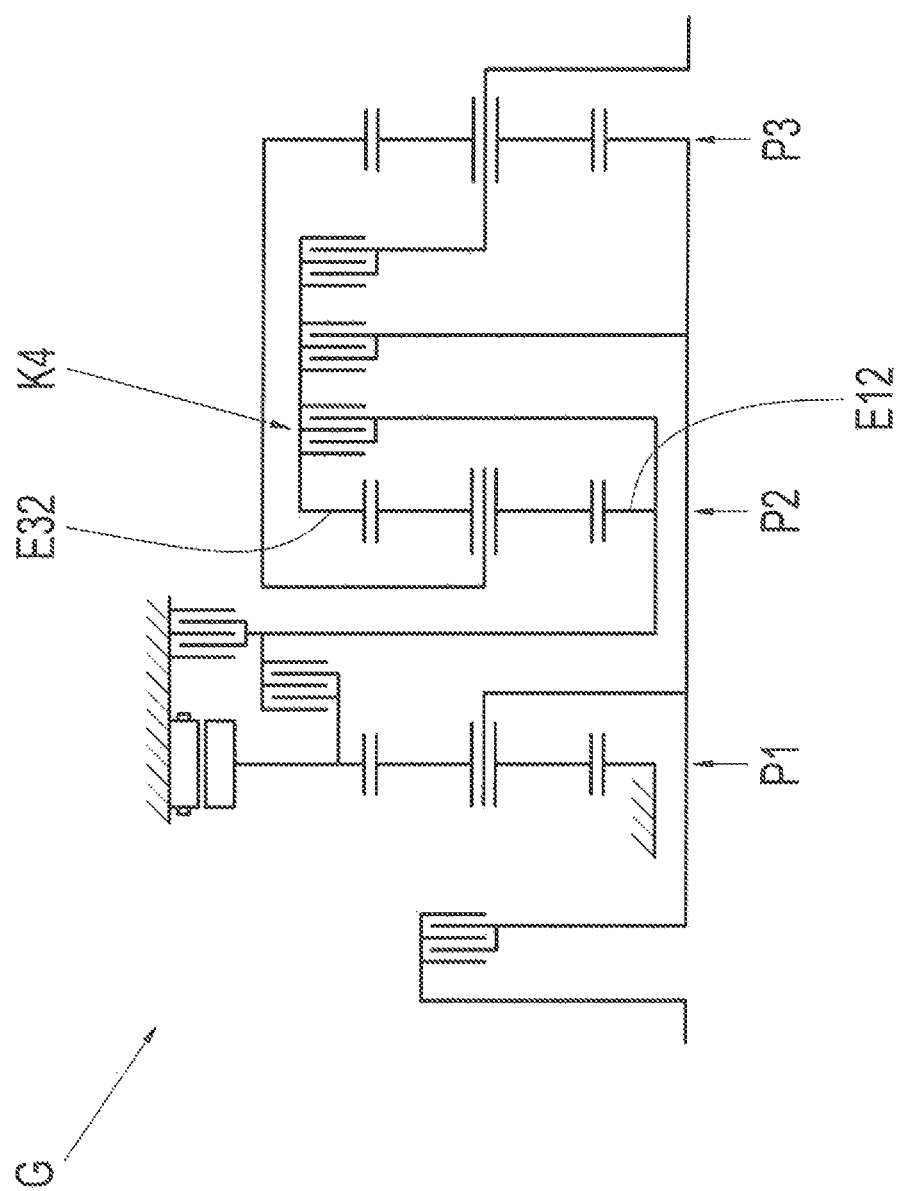
FIG. 4 shows a schematic view of a transmission according to a third embodiment of the invention.

Moreover, FIG. 4 shows a schematic representation of a transmission G according to a third embodiment of the invention. This largely corresponds to the variant according to FIG. 2, wherein, in contrast thereto, the fifth shift element K4 is provided between the first element E12 of the second planetary gear set P2 and the third element E32 of the second planetary gear set P2 and, upon actuation, connects the two elements E12 and E32 to each other in a rotationally fixed manner. An interlock of the second planetary gear set is therefore induced again upon engagement of the fifth shift element K4. For the rest, the embodiment according to FIG. 4 corresponds to the variant according to FIG. 2, and therefore reference is made to the description thereof.

Figure 5:
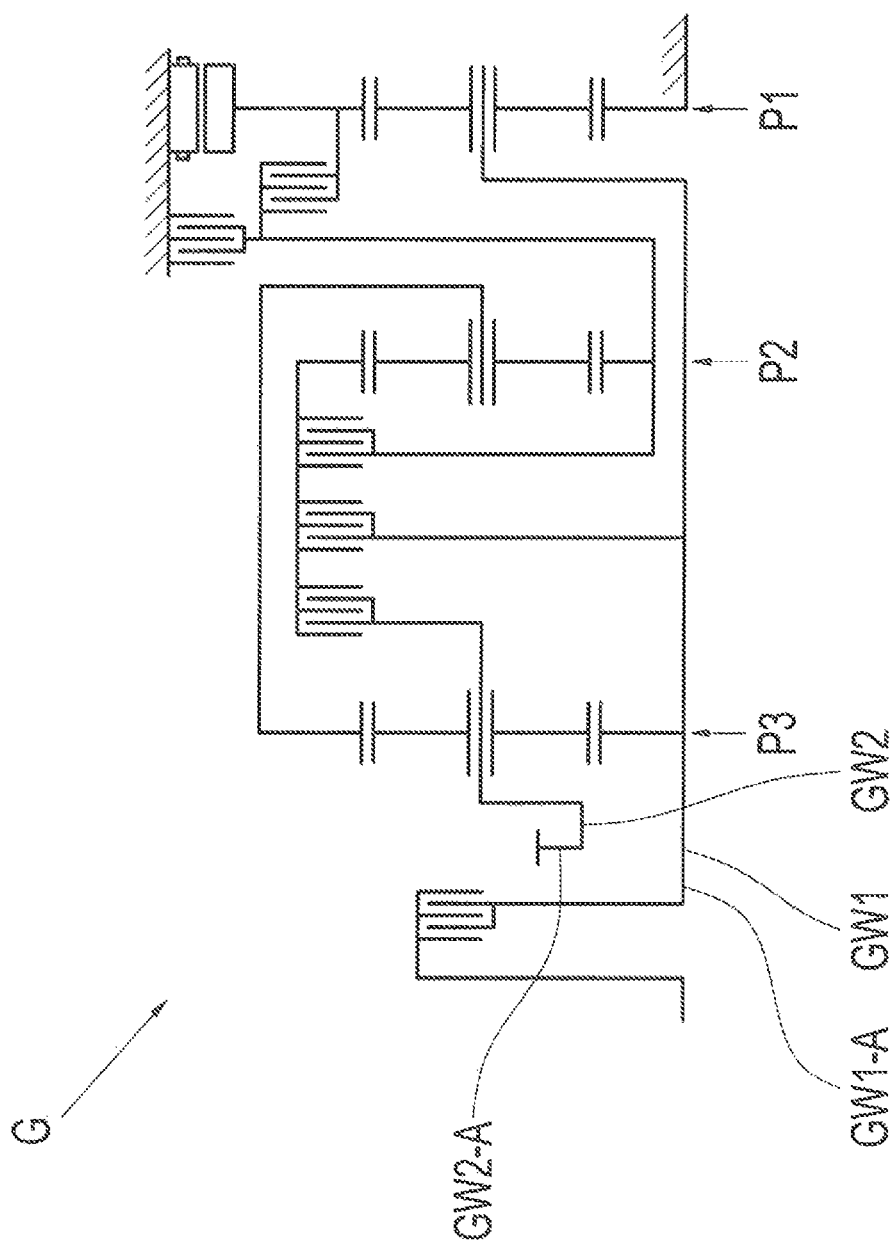
FIG. 5 shows a schematic representation of a transmission according to a fourth embodiment of the invention.

FIG. 5 shows a schematic view of a transmission G according to a fourth design option of the invention, which largely corresponds to the preceding variant represented in FIG. 4. As was the case with the embodiment according to FIG. 3, the arrangement of the three planetary gear sets P1, P2 and P3 has been changed and, in addition, the mounting interfaces GW1-A and GW2-A of the input shaft GW1 and of the output shaft GW2 are provided at one and the same end of the transmission G. In turn, the third planetary gear set P3 is provided directly adjacent to the two mounting interfaces GW1-A and GW2-A, wherein the second planetary gear set P2 and the first planetary gear set P1 follow thereon. In addition, the mounting interface GW2-A includes a tooth system which, in the installed condition of the transmission G, intermeshes with an associated tooth system of a shaft which is not represented. This shaft is then arranged axially parallel to the input shaft and the output shaft GW1 and GW2, wherein an axle transmission can then be arranged on this shaft. Therefore, the transmission G represented in FIG. 5 is suitable for the application in a motor vehicle drive train which, again, is aligned transversely to the direction of travel of the motor vehicle. For the rest, the transmission G in FIG. 5 corresponds to the preceding variant according to FIG. 4 in terms of the connection of the individual components, and therefore reference is made to the description thereof.

Figure 6:
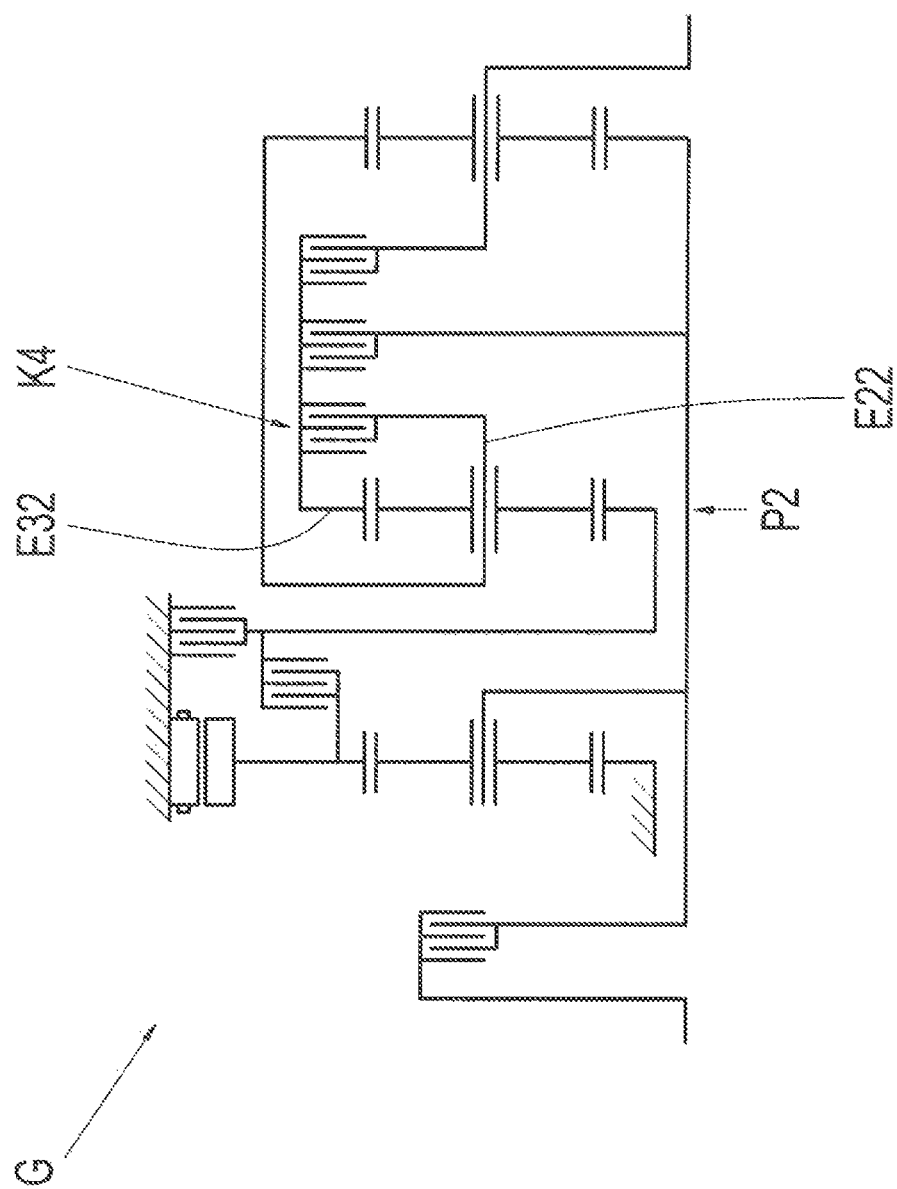
FIG. 6 shows a schematic view of a transmission according to a fifth embodiment of the invention.

FIG. 6 shows a transmission G according to a fifth embodiment of the invention, which also essentially corresponds to the variant from FIG. 2. The difference in this case, however, is that the fifth shift element K4, upon actuation, connects the second element E22 of the second planetary gear set P2 and the third element E32 of the second planetary gear set to each other in a rotationally fixed manner and, as a result, induces the interlock of the second planetary gear set P2. For the rest, the embodiment according to FIG. 6 corresponds to the variant according to FIG. 2, and therefore reference is made to the description thereof.

Figure 7:
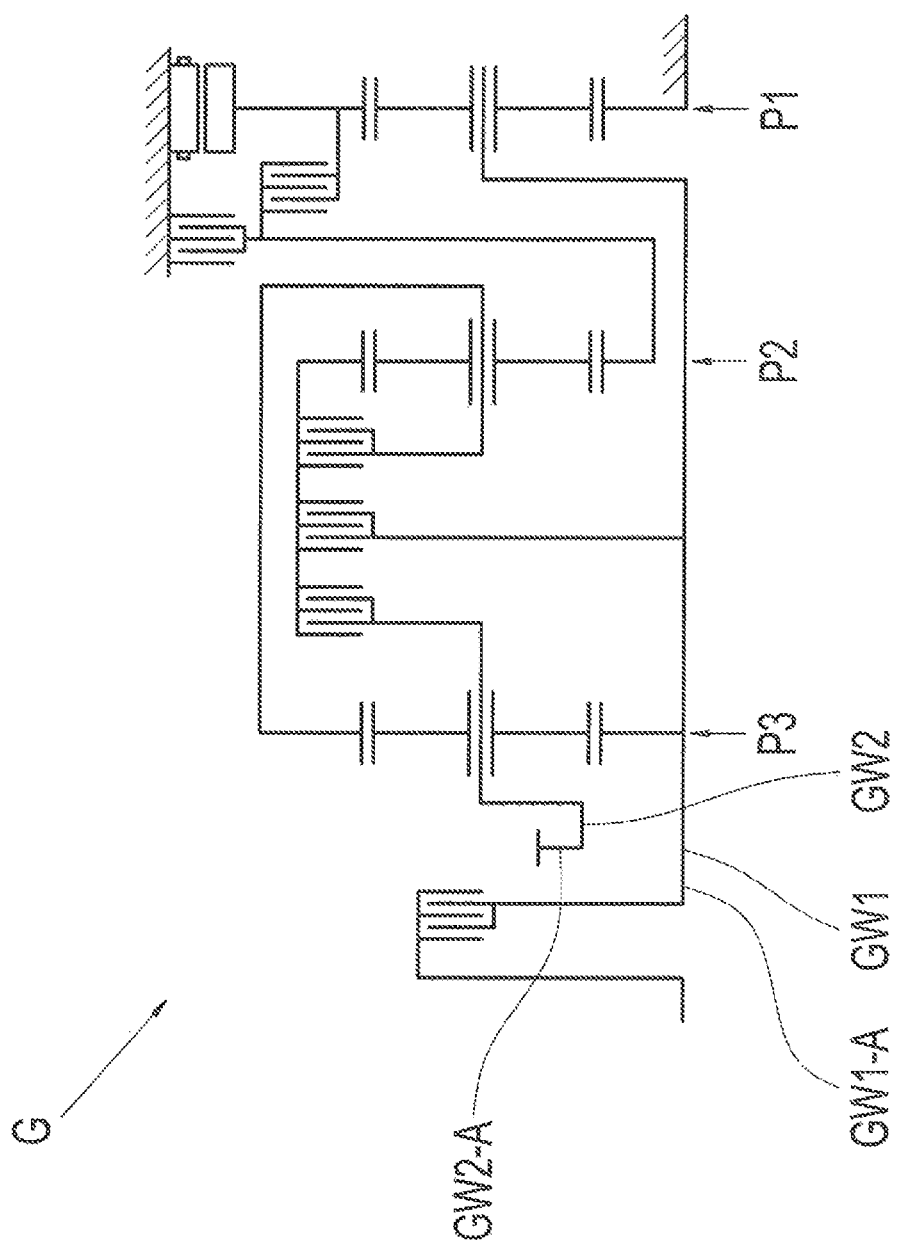
FIG. 7 shows a schematic representation of a transmission according to a sixth embodiment of the invention.

Moreover, FIG. 7 shows a schematic view of a transmission G according to a sixth design option of the invention. This largely corresponds to the preceding variant according to FIG. 6, wherein, as was the case with the embodiment according to FIG. 3, the arrangement of the three planetary gear sets P1, P2 and P3 has been changed and, in addition, the mounting interfaces GW1-A and GW2-A of the input shaft GW1 and of the output shaft GW2 have been provided at one and the same end of the transmission G. Again, the third planetary gear set P3 is provided directly adjacent to the two mounting interfaces GW1-A and GW2-A, wherein the second planetary gear set P2 and the first planetary gear set P1 follow thereon. In addition, the mounting interface GW2-A includes a tooth system which, in the installed condition of the transmission G, intermeshes with an associated tooth system of a shaft which is not represented. This shaft is then arranged axially parallel to the input shaft and the output shaft GW1 and GW2, wherein an axle transmission can then be arranged on this shaft. Therefore, the transmission G represented in FIG. 7 is suitable for the application in a motor vehicle drive train which, again, is aligned transversely to the direction of travel of the motor vehicle. For the rest, the transmission G in FIG. 7 corresponds to the preceding variant according to FIG. 6 in terms of the connection of the individual components, and therefore reference is made to the description thereof.

FIG. 8 shows an exemplary shift pattern for the respective transmission G from FIGS. 2 to 7 in table form. As is apparent, a total of seven forward gears 1 to 7 can be implemented in this case, wherein, in the columns of the shift pattern, an X indicates which of the shift elements B1, K1, K2, K3 and K4 is engaged in which of the forward gears 1 to 7. In each of the forward gears 1 to 7, two of the shift elements B1, K1, K2, K3, K4 are engaged, wherein, when the forward gears 1 to 7 are shifted in succession, with the exception of a fourth forward gear 4.3, one of the contributing shift elements is to be disengaged and another shift element is to be subsequently engaged in each case.

As is apparent in FIG. 8, a first forward gear 1 is selected by actuating the first shift element B1 and the fifth shift element K4, wherein, originating from here, a second forward gear 2 is formed by disengaging the fifth shift element K4 and subsequently engaging the third shift element K2. It is then possible to shift into a third forward gear 3 by disengaging the third shift element K2 and engaging the second shift element K1. Originating from here, a fourth forward gear 4.1 results in a first variant by disengaging the first shift element B1 and engaging the third shift element K2. Alternatively thereto, in order to shift into a fourth forward gear 4.2, the first shift element B1 is to be disengaged and the fifth shift element K4 is to be engaged. Further alternatively thereto, in order to implement a fourth forward gear 4.3, both the first shift element B1 as well as the second shift element K1 are to be disengaged and the shift elements K2 and K4 are to be engaged. In the latter case, two shift elements must therefore be disengaged and two other shift elements must be engaged, in deviation from the other gear shift operations.

A fifth forward gear 5 is then selected by actuating the second shift element K1 and the fourth shift element K3, wherein, originating from here, a sixth forward gear 6 is selected by disengaging the second shift element K1 and actuating the third shift element K2. Finally, originating from the sixth forward gear 6, a seventh forward gear 7 can be selected by disengaging the third shift element K2 and actuating the fifth shift element K4.

As represented in FIGS. 2 to 7, the shift elements B1, K1, K2, K3, K4 are each designed as friction-locking shift elements and, in particular, are designed as lamellar shift elements in this case. The first shift element B1 could also be implemented, in this case, as a form-fit shift element, such as a dog clutch or a lock-synchronizer mechanism.

In the case of the transmission G from FIGS. 2 to 7, travel of the motor vehicle in reverse cannot be implemented via the internal combustion engine VKM, but rather only purely via the electric machine EM which, for this purpose, initiates an appropriately oriented turning motion, wherein the first forward gear 1 is then preferably also selected in the transmission G. In order to not entrain the internal combustion engine VKM in this case, the separating clutch K0 is to be disengaged.

Figure 9:
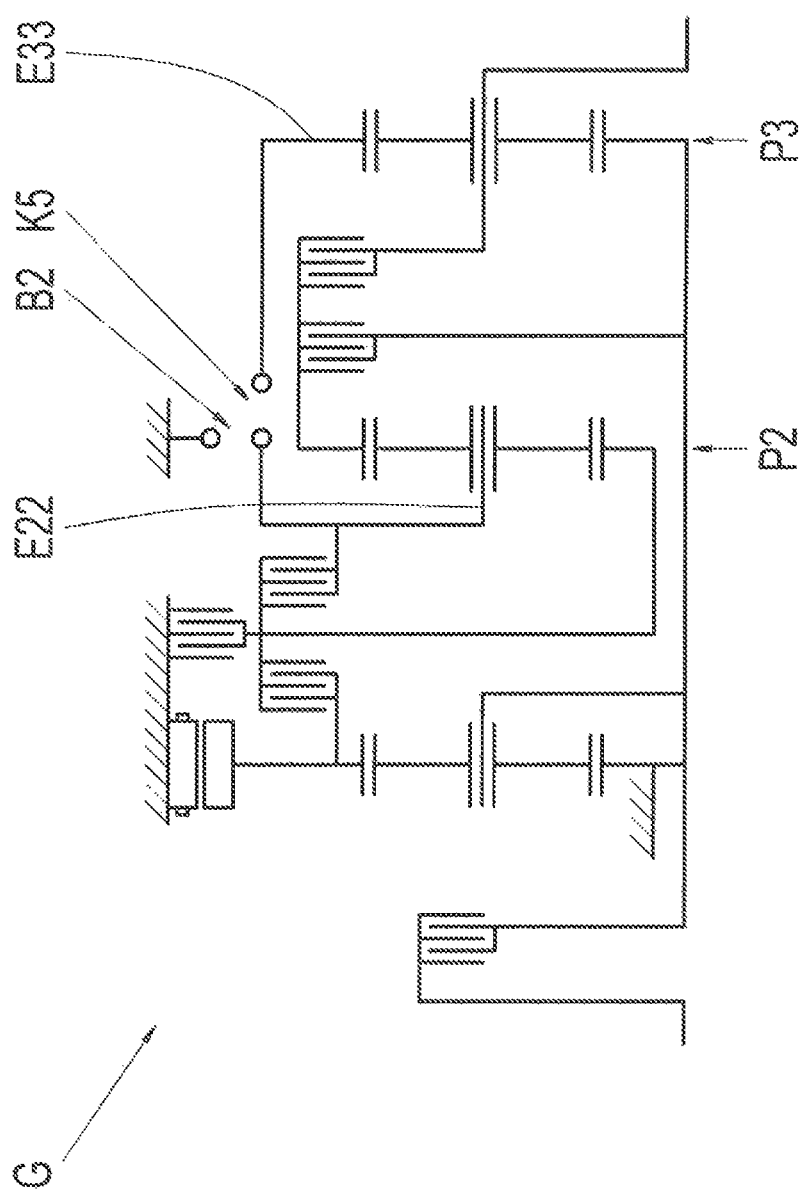
FIG. 9 shows a schematic view of a transmission according to a seventh embodiment of the invention.

FIG. 9 shows a seventh embodiment of a transmission G according to the invention, which, in turn, largely corresponds to the variant from FIG. 2. In contrast thereto, a sixth shift element K5 and a seventh shift element B2 are also provided, wherein the second element E22 of the second planetary gear set P2 can be connected in a rotationally fixed manner via the sixth shift element K5 to the third element E33 of the third planetary gear set P3, while an actuation of the seventh shift element B2 results in a fixing of the second element E22 to the housing GG. The sixth shift element K5 and the seventh shift element B2 are designed as form-fit shift elements in this case and are combined to form a double shift element. For the rest, the transmission G in FIG. 9 corresponds to the variant according to FIG. 2 in terms of the connection of the individual components, and therefore reference is made to the description thereof.

Finally, yet another exemplary shift pattern of the transmission G from FIG. 9 is represented in table form in FIG. 10, wherein a representation of seven forward gears 1 to 7 essentially corresponds, in this case, to that which was described with reference to FIG. 8. The only difference here is that the sixth shift element K5 is also to be actuated in the forward gears 1 to 7. In addition, a reverse gear R1 can also be selected in this case, during driving via the internal combustion engine, by actuating the shift elements K2, K3 and B2.

Through the embodiments according to the invention, a transmission having a compact design and good efficiency can be implemented.

Modifications and variations can be made to the embodiments illustrated or described herein without departing from the scope and spirit of the invention as set forth in the appended claims.

REFERENCE CHARACTERS

G transmission
GG rotationally fixed component
P1 first planetary gear set
E11 first element of the first planetary gear set
E21 second element of the first planetary gear set
E31 third element of the first planetary gear set
P2 second planetary gear set
E12 first element of the second planetary gear set
E22 second element of the second planetary gear set
E32 third element of the second planetary gear set
P3 third planetary gear set
E13 first element of the third planetary gear set
E23 second element of the third planetary gear set
E33 third element of the third planetary gear set
B1 first shift element
K1 second shift element
K2 third shift element
K3 fourth shift element
K4 fifth shift element
K5 sixth shift element
B2 seventh shift element
1 first forward gear
2 second forward gear
3 third forward gear
4.1 fourth forward gear
4.2 fourth forward gear
4.3 fourth forward gear
5 fifth forward gear
6 sixth forward gear
7 seventh forward gear
R1 reverse gear
GW1 input shaft
GW1-A external interface of the input shaft
GW2 output shaft
GW2-A external interface of the output shaft
EM electric machine
S stator
R rotor
AN connecting shaft
K0 separating clutch
VKM internal combustion engine
TS torsional vibration damper
AG axle transmission
DW driving wheels

The invention claimed is:
1. A transmission (1) for a motor vehicle, comprising:
an input shaft (GW1);
an output shaft (GW2);
a plurality of planetary gear sets (P1, P2, P3) with a first planetary gear set (P1), a second planetary gear set (P2) and a third planetary gear set (P3), each of the plurality of planetary gear sets (P1, P2, P3) comprises a first element (E11, E12, E13), a second element (E21, E22, E23) and a third element (E31, E32, E33) which are utilized for guiding a power flow from the input shaft (GW1) to the output shaft (GW2), the first, second and third elements each being a respective one of a sun gear, a ring gear, and a planet carrier;
a plurality of shift elements (B1, K1, K2, K3, K4) with a first shift element (B1), a second shift element (K1), a third shift element (K2), a fourth shift element (K3) and a fifth shift element (K4), selective actuation of the plurality of shift elements coupling the plurality of planetary gear sets (P1, P2, P3) while selecting different forward gears (1 to 7) between the input shaft (GW1) and the output shaft (GW2), wherein the first element (E11) of the first planetary gear set (P1) is permanently rotationally fixed, and the second element (E21) of the first planetary gear set (P1) is connected to the input shaft (GW1), wherein the third element (E31) of the first planetary gear set (P1) is connectable in a rotationally fixed manner to the first element (E12) of the second planetary gear set (P2) by the fourth shift element (K3), and the first element (E12) of the second planetary gear set (P2) is fixable in a rotationally fixed manner to a housing (GG) of the transmission (G) by the first shift element (B1), wherein the second planetary gear set (P2) is interlockable with the fifth shift element (K4), wherein the third element (E32) of the second planetary gear set (P2) is connectable in a rotationally fixed manner to the input shaft (GW1) by the second shift element (K1), the third element (E32) of the second planetary gear set (P2) is also connectable in a rotationally fixed manner to the second element (E23) of the third planetary gear set (P3) by the third shift element (K2), and the second element (E23) of the second planetary gear set (P2) is coupled in a rotationally fixed manner to the output shaft (GW2), and wherein the first element (E13) of the third planetary gear set (P3) is connected in a rotationally fixed manner to the input shaft (GW1).

2. The transmission (G) of claim 1, wherein the second element (E22) of the second planetary gear set (P2) is permanently connected in a rotationally fixed manner to the third element (E33) of the third planetary gear set (P3).

3. The transmission (G) of claim 2, wherein:
a first forward gear (1) is selectable by actuating the first shift element (B1) and the fifth shift element (K4);
a second forward gear (2) is selectable by actuating the first shift element (B1) and the third shift element (K2);
a third forward gear (3) is selectable by actuating the first shift element (B1) and the second shift element (K1);
a fourth forward gear (4.1; 4.2; 4.3) is selectable by actuating the second shift element (K1) and the third shift elements (K2), by actuating the second shift element (K1) and the fifth shift element (K4) or by actuating the third shift element (K2) and the fifth shift element (K4);
a fifth forward gear (5) is selectable by actuating the second shift element (K1) and the fourth shift element (K3);
a sixth forward gear (6) is selectable by actuating the third shift element (K2) and the fourth shift element (K3); and
a seventh forward gear (7) is selectable by actuating the fourth shift element (K3) and the fifth shift element (K4).

4. The transmission (G) of claim 1, wherein the plurality of shift elements includes a sixth shift element (K5) and a seventh shift element (B2), wherein:
the second element (E22) of the second planetary gear set (P2) is connectable in a rotationally fixed manner to the third element (E33) of the third planetary gear set (P3) by the sixth shift element (K5); and the second element (E22) of the second planetary gear set (P2) is fixable to the housing (GG) by the seventh shift element (B2).

5. The transmission (G) of claim 4, wherein:
a first forward gear (1) is selectable by actuating the first shift element (B1), the fifth shift element (K4), and the sixth shift element (K5);
a second forward gear (2) is selectable by actuating the first shift element (B1), the third shift element (K2), and the sixth shift element (K5);
a third forward gear (3) is selectable by actuating the first shift element (B1), the second shift element (K1), and the sixth shift element (K5);
a fourth forward gear (4.1; 4.2; 4.3) is selectable by actuating the second shift element (K1), the third shift element (K2), and the sixth shift element (K5), by actuating the second shift element (K1), the fifth shift element (K4), and the sixth shift element (K5) or by actuating the third shift element (K2), the fifth shift element (K4), and the sixth shift element (K5);
a fifth forward gear (5) is selectable by actuating the second shift element (K1), the fourth shift element (K3), and the sixth shift element (K5);
a sixth forward gear (6) is selectable by actuating the third shift element (K2), the fourth shift element (K3), and the sixth shift element (K5);
a seventh forward gear (7) is selectable by actuating the fourth shift element (K3), the fifth shift element (K4), and the sixth shift element (K5); and
a reverse gear (R1) is selectable by actuating the third shift element (K2), the fourth shift element (K3), and the seventh shift element (B2).

6. The transmission (G) of claim 1, wherein:
the fifth shift element (K4) couples the first element (E12) of the second planetary gear set (P2) to the second element (E22) of the second planetary gear set (P2) in a rotationally fixed manner upon actuation of the fifth shift element (K4);
the fifth shift element (K4) couples the first element (E12) of the second planetary gear set (P2) to the third element (E32) of the second planetary gear set (P2) in a rotationally fixed manner upon actuation of the fifth shift element (K4); or
the fifth shift element (K4) couples the second element (E22) of the second planetary gear set (P2) to the third element (E32) of the second planetary gear set (P2) in a rotationally fixed manner upon actuation of the fifth shift element (K4).

7. The transmission (G) of claim 1, further comprising an electric motor (EM), a rotor (R) of the electric motor (EM) coupled in a rotationally fixed manner to one of the first, second and third elements (E11, E12, E13, E21, E22, E23, E31, E32, E33) of the plurality of planetary gear sets (P1, P2, P3).

8. The transmission (G) of claim 7, wherein the rotor (R) is coupled to the third element (E31) of the first planetary gear set (P1).

9. The transmission (G) of claim 1, further comprising a separating clutch (K0), the input shaft (GW1) couplable in a rotationally fixed manner to a connecting shaft (AN) by the separating clutch (K0).

10. The transmission (G) of claim 1, wherein one or more of the plurality of planetary gear sets (P1, P2, P3) is a minus planetary gear set with the respective first element (E11, E12, E13) corresponding to the sun gear, the respective second element (E21, E22, E23) corresponding to the planet carrier, and the respective third element (E31, E32, E33) corresponding to the ring gear.

11. The transmission (G) of claim 1, wherein one or more of the plurality of planetary gear sets (P1, P2, P3) is a plus planetary gear set with the respective first element (E11, E12, E13) corresponding to the sun gear, the respective second element (E21, E22, E23) corresponding to the ring gear, and the respective third element (E31, E32, E33) corresponding to the planet carrier.

12. The transmission (G) of claim 1, wherein one or more of the plurality of shift elements (B1, K1, K2, K3, K4) is a friction-locking shift element.

13. The transmission (G) of claim 1, wherein the first shift element (B1) is a form-fit shift element.

14. The transmission (G) of claim 1, wherein a mounting interface (GW1-A) of the input shaft (GW1) is positioned coaxially with a mounting interface (GW2-A) of the output shaft (GW2).

15. A motor vehicle drive train, comprising the transmission (G) of claim 1.

* * * * *